UNITED STATES PATENT OFFICE.

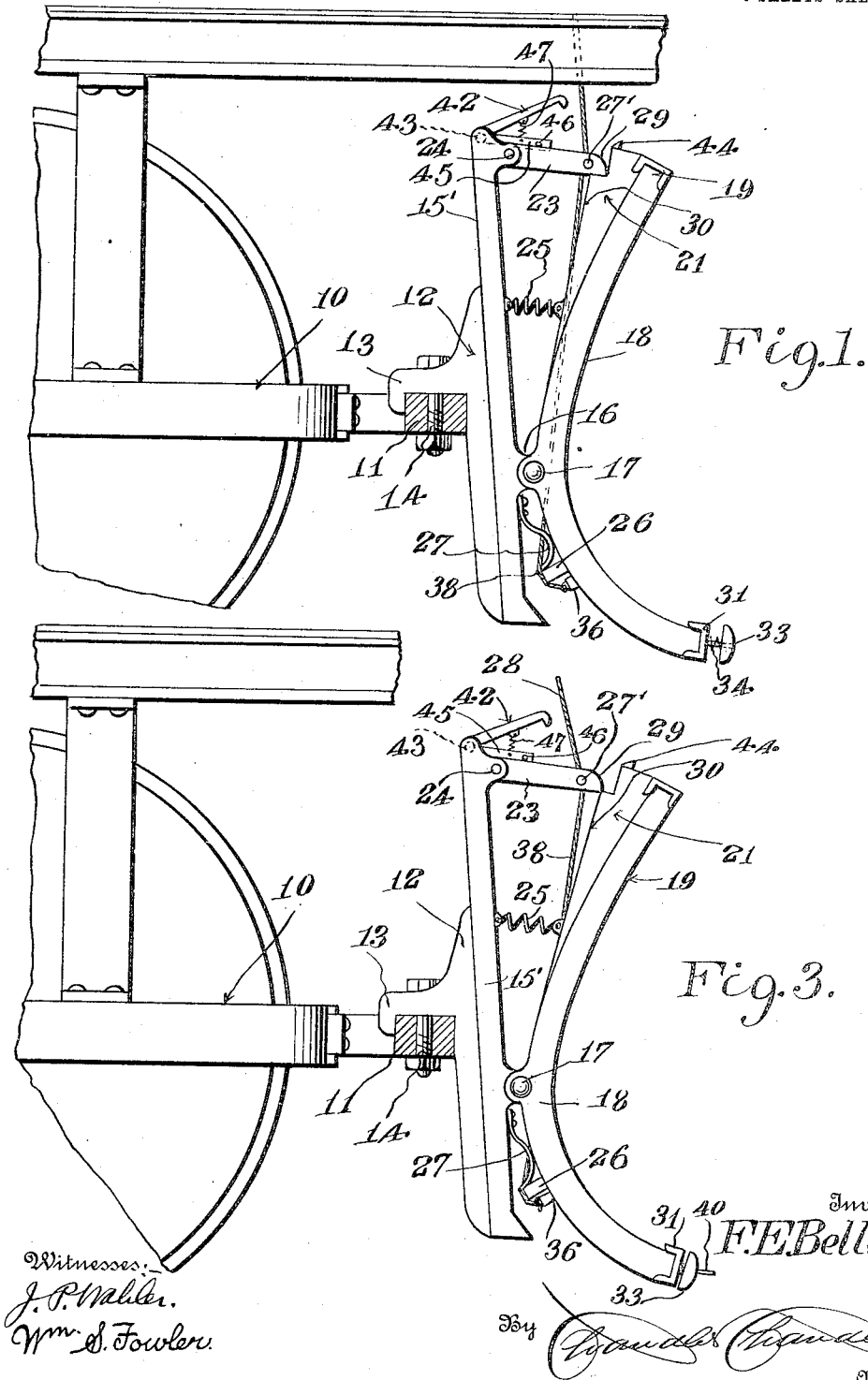

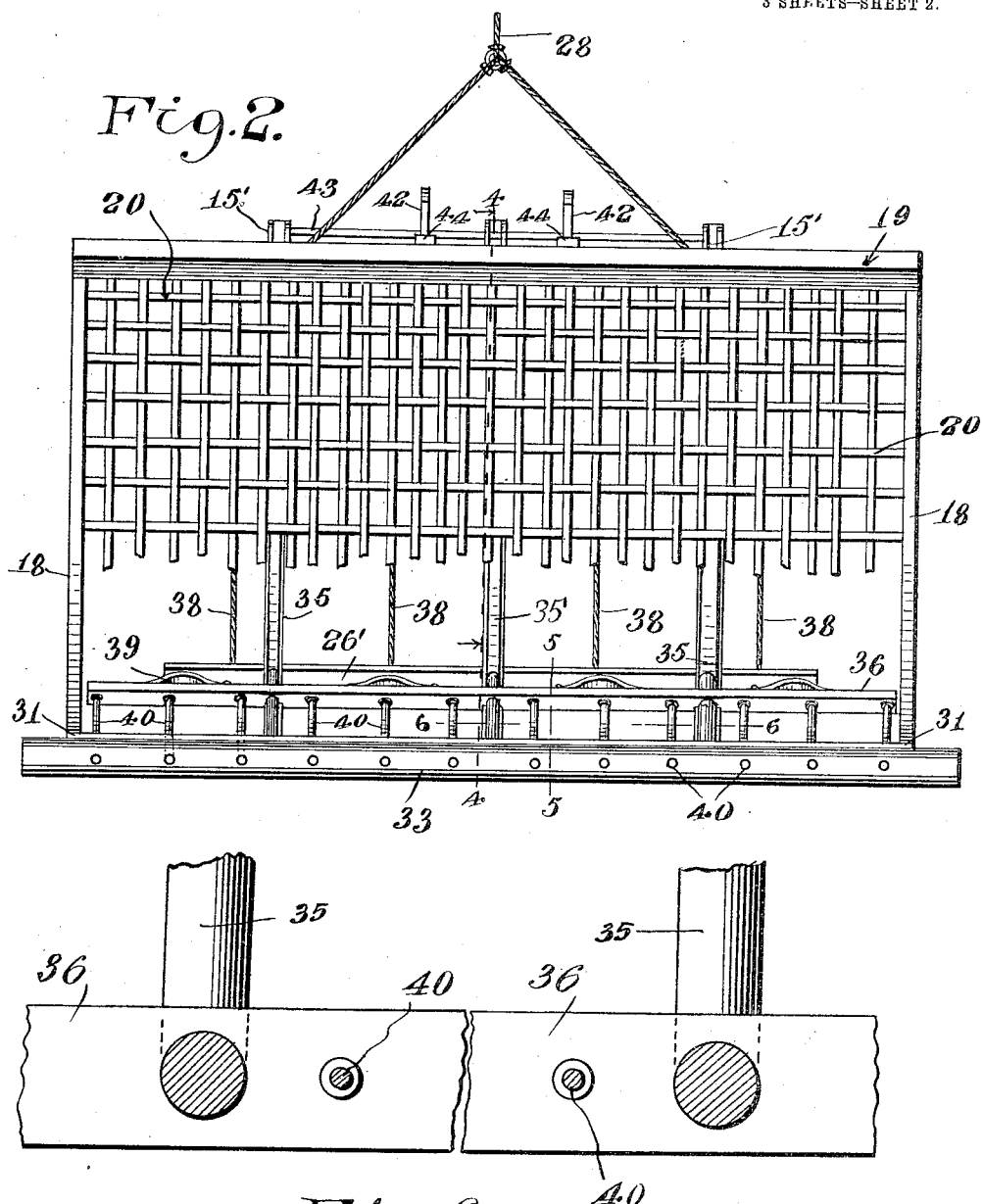

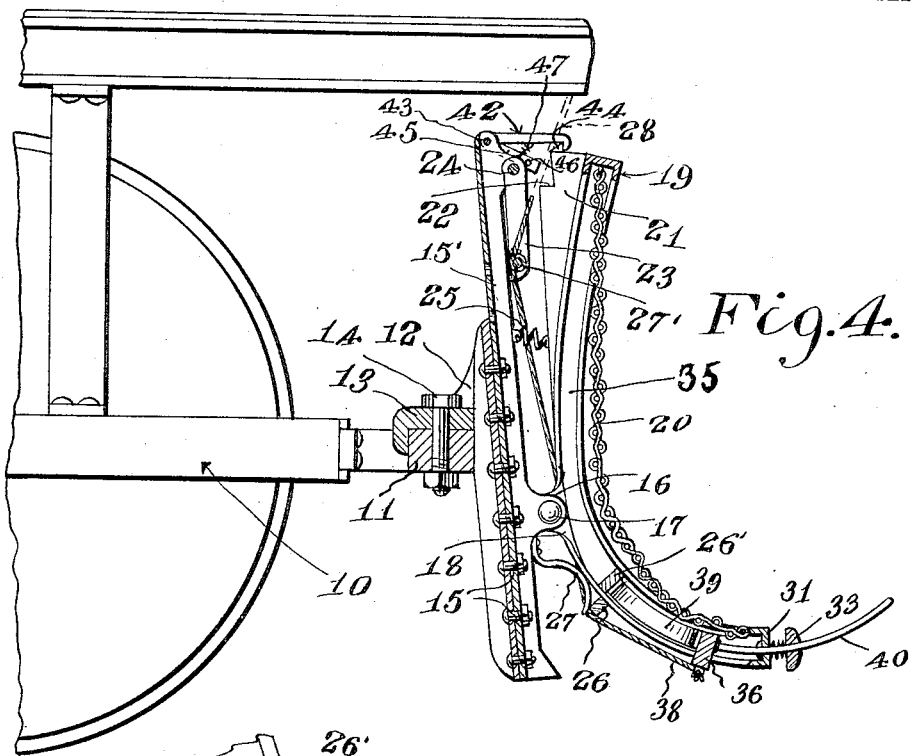
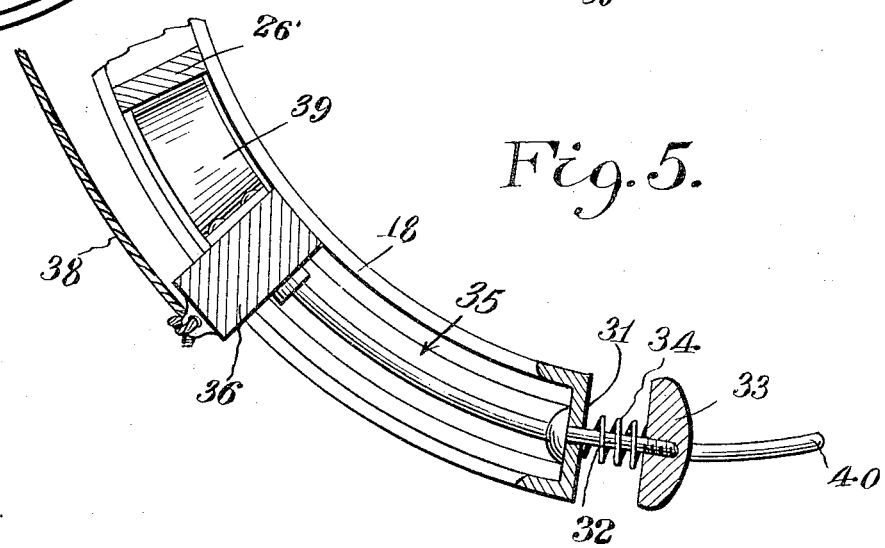

FRED E. BELLOWS, OF WORCESTER, MASSACHUSETTS.

SAFETY-FENDER.

1,130,056.  Specification of Letters Patent.  Patented Mar. 2, 1915.

Application filed May 8, 1912. Serial No. 695,982.

*To all whom it may concern:*

Be it known that I, FRED E. BELLOWS, a citizen of the United States, residing at Worcester, in the county of Worcester, State of Massachusetts, have invented certain new and useful Improvements in Safety-Fenders; and I do hereby declare the following to be a full, clear, and exact description of the invention, such as will enable others skilled in the art to which it appertains to make and use the same.

My invention relates to new and useful improvements in safety fenders and more especially to fenders adapted for attachment to the wheeled trucks of an electric car or the like and the object of my invention is to improve the construction and increase the efficiency of fenders of the above described character.

A further object of my invention is to provide a fender having a cushioned bar at its forward edge adapted to decrease the shock of the blow experienced by the person or animal struck by the same.

A further object of my invention is to provide a fender which will be swingingly mounted in such a manner that upon striking a person or animal its forward lower portion will be swung forwardly and upwardly to pick up the person or animal struck. And a still further object of my invention is to provide an auxiliary guard member movable when released, beyond the forward portion of the main fender, to a position such as to hold the person or animal so picked up upon the fender.

With these and other objects in view, my invention will be more fully described and illustrated in the accompanying drawings, which show a preferred embodiment of my device, and then specifically pointed out in the claims which are attached to and form a part of this application.

In the drawings, Figure 1 is a fragmentary side elevation of a conventional form of car truck showing my improved fender applied thereto, the fender being shown in normal position. Fig. 2 is a front elevation of the fender partly broken away. Fig. 3 is a side elevation showing the position of the fender at the moment of the release of the catch. Fig. 4 is a section on the line 4—4 of Fig. 2 showing the fender in operative position. Fig. 5 is a section on the line 5—5 of Fig. 2 and Fig. 6 is a section on the line 6—6 of Fig. 2.

Referring more specifically to the drawings in which similar reference numerals designate corresponding parts throughout, 10 designates a conventional form of car truck having a transversely extending forward truck frame member 11 to which is secured my improved fender. My fender is secured upon its truck frame member by means of a plurality of spaced brackets 12 having rearwardly directed hooks 13 which engage over the upper edge of the frame, said brackets being further secured in place by bolts 14 passed through the bight portions of the hooks and through the frame and secured in place by nuts. Adjustably secured by bolts 15 to each of these brackets is a vertically extending hanger 15' provided intermediate its length with a forward extension 16 fitted to form one member of a two part hinge 17 the other member of which is formed upon a similar extension upon the rear face 18 of the fender-net supporting braces 35. These net supporting members 35, as shown, are arcuate in shape and are parts of the rectangular frame of the fender. This frame is preferably formed from a single strip of channel iron bent in the shape as shown in the drawing, and comprises a top bar 19, a bottom bar 31 and connecting side bars 18—18 therefor, or it may be formed from separate members secured together in any suitable manner. The lower ends of these net supporting braces 35—35—35 are rounded to receive a cross-bar 36, which will be subsequently described. This frame carries a netting formed by a plurality of interwoven transversely and longitudinally extending straps 20 which form the body of the fender.

Each of the braces 35 is provided at its upper end with an enlarged head 21 the rear portion of which is cut or notched to form a seat 22 to receive the forward end of a catch 23 which is pivoted, as at 24, to the upper end of the hanger 15', these catches serving to normally maintain the fender substantially upright in the position shown in Fig. 1 of the drawings with its lower forward edge just clear of the ground. Helical springs 25 connect each of the brace members with its respective hanger at a point intermediate between their hinge and catch and these springs tend to draw the upper portion of the fender rearwardly and consequently to tilt the lower portion forwardly and upwardly. Extending transversely of the fender and secured to the rear faces of the braces at points below the hinges is a bar 26, and secured by one end to each of the hangers and bearing by their other ends against this bar, are coil or leaf springs 27 which also tend to force the lower portion of the fender outwardly and upwardly and so to assist the action of the springs 25.

As will be readily seen if the lower advance edge of the lower edge of the fender will be swung first slightly backwardly and the top or upper edge of the fender strikes against an object the fender will be swung forwardly against the action of the springs 25 and 27 to release the catches 23 from their seats, when the catches will fall by gravity to permit the springs 25 and 27 to swing the fender to the position shown in Fig. 4. Extending transversely through the free ends of the catches 23 is a rod 27' and connected to this rod intermediate its length is a cable 28 which preferably runs to a point convenient to the motorman. By means of this cable the fender can be reset by swinging the catches 23 upwardly, their rounded ends 29 bearing against the inclined faces 30 of the brace heads 21 and forcing the braces outwardly against the action of the springs. Extending through the forward portion 31 of the frame member of the fender are a plurality of bolts 32 the outer ends of which are threaded into a longitudinally extending bar 33 which as shown, is substantially semi-elliptical in cross section and is yieldably maintained in spaced relation with respect to the frame by means of a plurality of helical springs 34 which surround the bolts and bear between the frame and bar; the bar thus serving as a cushioning device for breaking the shock of impact with the fender.

Extending transversely of the fender is a bar 36 with its ends slidable in the channel irons 18—18, said bar being provided with transverse apertures, shown herein as round, to receive loosely the curvilinear lower ends of the braces 35—35—35, whereby the bar 36 is slidably mounted relative to the side bars 18—18 and the net supporting braces 35—35—35. This bar is normally maintained in close proximity to the bar 26 by means of a plurality of cables 38 which connect the bar at spaced intervals with the rod 27' passed through the free end of the catches and it will therefore be seen that upon the release of the catches and the forward and upward tilting of the fender this bar will be free for outward movement away from the bar 26. A plurality of coil or leaf springs 39 are carried by the bar 36 and bear by their free ends against the bar 26', the function of these springs being to force the bar 36 downwardly. The bar 36 is provided with a plurality of spaced tines 40 which are curved to correspond with the curvature of the lower portions of the side bars 18 and which are slidably mounted through suitable perforations formed in the lower frame member 31 and in the bar 33, the free ends of the tines terminating flush with the outer face of the bar 33 when the bar 36 is in set position and extending forwardly and upwardly beyond the same when the bar is in lowered position as shown in the drawings.

The operation of my improved fender is very simple and therefore needs but slight description. Normally the parts are in the position shown in Fig. 1 of the drawings the fender being held with its lower portion in set position by means of the catches 23 and springs 25 and 27, and with the tine bearing bar in set position as shown in Fig. 1. Upon striking an object the cushioning bar 33 is forced back against the action of its springs and the fender as a whole swings upon its hinges 17, the top of the fender swinging forwardly and the bottom of the fender swinging backwardly to release the catches 23 when the springs 25 and 27 immediately act to tilt the top of the fender rearwardly and move its lower portion forwardly and upwardly to sprung position, picking up the object struck. At the same time the release of the catches releases the tine bearing bar and its springs force it downwardly to move its tines into position as shown in Fig. 4 of the drawings to assist in picking up and holding the objects struck. It will be seen, therefore, that on contact of the bar 33 with an obstacle, the bar first yields rearwardly, the fender as a whole next swings about the hinge 17, the bottom of the fender moving rearwardly somewhat and the top of the fender moving forwardly providing a step-by-step yielding movement of the fender and its contact member, thus minimizing the force of the blow resulting from the contact of the fender with an obstacle and greatly minimizing the danger of injury, if it be a person who receives the blow of the fender. The bottom of the fender next moves forwardly owing to the action of the springs 25 and 27; this forward movement being, of course, accompanied by the projecting forward of the tines 40 comprising the obstacle supporting member. When the fender is to be reset, strain is exerted upon the cable 28 to move the catches 23 upwardly, said movement of the catches tilting the fender back to normal position and also replacing the tine bearing bar. For the sake of additional security I have provided hooks 42 which are mounted upon the rod 43 extending through the upper ends of the hangers 15', said hooks having their forward ends bent for engagement with the lugs 44 upon the enlarged heads of the braces 18. The arms 45 also project from the rod 43 and have their lower ends connected by means of the rod 46 which rests upon the upper edge of the catches 23. The hooks 42 and arms 45 are connected by the springs 47, the purpose of which will readily appear. Owing to the weight of the hooks 42 and the arms 43 resiliently connected therewith, said arms and hooks will drop to their lowermost positions, with the free ends of the said hooks in engagement with the lugs 44, upon the release and downward movement of the catches 23. As soon, however, as force is applied to raise the catches 23, said hooks will force the rod 46 upwardly and thus through the medium of the arms 45 and springs 47, disengage the hooks 42 by forcing the same upwardly.

From the foregoing description it will be apparent that I have provided a simple and efficient form of fender having not only a cushioned bar but one also adapted to break the shock of the blow. It will further be apparent that I have so mounted my fender that it will be automatically tilted upon engagement with an obstacle to pick up the obstacle and it will further be apparent that I have provided means actuated by the tilting of the fender for holding the obstacle picked up upon the fender.

It will of course be understood that I do not wish in any way to limit myself to the specific structure shown and described as minor changes in details within the scope of the appended claims may be made if desired without in the slightest degree departing from the spirit of my invention.

What I claim is:—

1. A device of the character described, comprising a plurality of hangers adapted to be secured to the truck frame of a car, a plurality of arcuate braces hinged intermediate their length to said hangers and thereby positioned substantially upright, a netted frame carried by said braces, a plurality of catches for normally holding said braces in one position, said catches being adapted to be released by pressure exerted against the lower portion of the netted frame, and means for swinging the netted frame upon the release of said catches.

2. In a device of the character described, the combination with the frame of a car truck, of hangers mounted upon said frame, a tilting fender member carried by said hangers in a substantially upright position, means for normally holding said fender with its lower portion adjacent the ground, means operable by force exerted upon said lower portion for tilting the fender to move said lower portion forwardly and upwardly, means for automatically locking said fender in tilted position, and means for simultaneously releasing said locking means, tilting the fender back to normal position, and locking the same in normal position.

3. In a device of the character described, the combination with the frame of a car truck, of hangers carried by said frame, a tilting fender frame carried by said hangers in a substantially upright position, means for normally holding said fender frame in set position, means operable by the impact of a fender against an obstacle for springing said frame to pick up the obstacle, automatic locking means for holding the frame in sprung position, and means operable by a cable for resetting said fender frame.

4. In a device of the character described, the combination with the frame of a car truck, of hangers carried by said frame, a tilting fender frame carried by said hangers in a substantially upright position, a movable bar carried by said frame and provided with tines, means operable by the impact of the fender to simultaneously tilt the frame to pick up the obstacle and move the bar with its tines to position for holding the obstacle, and means for simultaneously tilting the frame to normal position and for moving the bar to its original position.

5. A yieldingly mounted vehicle fender comprising hangers, a frame pivotally supported thereon in a substantially upright position, a cushioning device on the frame, an obstacle holding projectable member on the fender, locking means for the fender and obstacle holding member and means for projecting the lower end of the fender and holding member forward upon rearward yielding movement of the cushioning device and frame.

6. A vehicle fender comprising hangers, frame carrying braces pivoted intermediate their ends to the hangers and normally positioned substantially upright thereon and close against the hangers, the portions of the braces above the point of suspension being extended upwardly and outwardly therefrom, means for locking the frame and braces normally in said position, means to project the lower end of the frame and braces forward following an impact of the frame with an obstacle, means for locking the upper ends of the braces and frame in retracted position upon such impact, and means to project a supplemental obstacle-holding section forward from the lower frame end.

7. A vehicle frame comprising hangers, fender carrying braces pivoted intermediate their ends to the hangers and normally positioned substantially upright thereon and close against the hangers, the portions of the braces above the point of suspension being extended upwardly and outwardly therefrom, means for locking the frame and braces normally in said position, means to project the lower end of the frame and braces forward upon impact of the frame with an obstacle, means for locking the upper ends of the braces and frame in retracted position following such impact, means to project a supplemental obstacle-holding section forward from said lower frame end, and retracting means for the obstacle-receiving section operable from a point above the hangers for resetting the frame and supplemental obstacle-receiving section to automatically and simultaneously lock them in normal position.

In testimony whereof, I affix my signature, in presence of two witnesses.

FRED E. BELLOWS.

Witnesses:
J. HOWARD TERRILL,
GEORGE W. HASTINGS.

Copies of this patent may be obtained for five cents each, by addressing the "Commissioner of Patents, Washington, D. C."